United States Patent
Jhang et al.

(10) Patent No.: US 11,892,748 B2
(45) Date of Patent: Feb. 6, 2024

(54) CONTROL METHOD FOR OCCLUSION COMPONENT AND ELECTRONIC DEVICE

(71) Applicant: Acer Incorporated, New Taipei (TW)

(72) Inventors: Jia-Ling Jhang, New Taipei (TW); Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/960,103

(22) Filed: Oct. 4, 2022

(65) Prior Publication Data

US 2023/0194957 A1 Jun. 22, 2023

(30) Foreign Application Priority Data

Dec. 16, 2021 (TW) .................................. 110147099

(51) Int. Cl.
*G03B 11/04* (2021.01)

(52) U.S. Cl.
CPC .................................. *G03B 11/043* (2013.01)

(58) Field of Classification Search
None
See application file for complete search history.

(56) References Cited

U.S. PATENT DOCUMENTS

| | | | |
|---|---|---|---|
| 2015/0093102 A1* | 4/2015 | Oguchi | G03B 11/043 396/435 |
| 2015/0172520 A1* | 6/2015 | Lindman | H04N 23/51 382/190 |
| 2022/0019126 A1* | 1/2022 | Peana | H04N 7/18 |
| 2022/0400200 A1* | 12/2022 | Lagnado | H04N 23/60 |
| 2023/0054882 A1* | 2/2023 | Nakano | H04N 23/55 |

FOREIGN PATENT DOCUMENTS

| TW | 202113537 | 4/2021 |
|---|---|---|
| TW | M612890 | 6/2021 |

* cited by examiner

*Primary Examiner* — Clayton E. LaBalle
*Assistant Examiner* — Diana Hancock
(74) *Attorney, Agent, or Firm* — JCIPRNET (57) ABSTRACT

A control method for an occlusion component and an electronic device are disclosed. The method includes: in a first status of the electronic device, controlling the occlusion component to be located at a first position on the electronic device to occlude a lens of the electronic device; in a second status of the electronic device, detecting a trigger signal and a target object in front of the lens, wherein the trigger signal is generated by triggering a physical button of the electronic device, and the first status is different from the second status; and in a situation where the trigger signal is detected and the target object exists, controlling the occlusion component to move to a second position on the electronic device to expose the lens.

20 Claims, 6 Drawing Sheets

FIG. 7 ial no. 110147099, filed on Dec. 16, 2021.

CONTROL METHOD FOR OCCLUSION COMPONENT AND ELECTRONIC DEVICE

CROSS-REFERENCE TO RELATED APPLICATION

This application claims the priority benefit of Taiwan application serial no. 110147099, filed on Dec. 16, 2021. The entirety of the above-mentioned patent application is hereby incorporated by reference herein and made a part of this specification.

BACKGROUND

Technical Field

The disclosure relates to a device control technique, and more particularly to a control method for an occlusion component and an electronic device.

Description of Related Art

Generally speaking, for convenience, there is no obstruction in front of the lens of a notebook or a tablet computer. When there is a need to perform the image capture function, one only needs to activate the lens through a software. However, in practice, hackers can gain access and control permissions to the affected computer's lens by remotely hacking into the affected computer's operating system.

SUMMARY

The disclosure provides a control method for an occlusion component and an electronic device, which can achieve fully automatic lens security control through the interaction between hardware electronic components.

An embodiment of the disclosure provides an electronic device, which includes a lens, a physical button, a distance sensor, an occlusion component, and a control circuit. The control circuit is coupled to the physical button, the distance sensor and the occlusion component. The control circuit is configured to: in a first status of the electronic device, control the occlusion component to be located at the first position on the electronic device to occlude the lens; in a second status of the electronic device, detect a trigger signal generated by triggering the physical button and detect a target object in front of the lens through the distance sensor. The first status is different from the second status. In a situation where the trigger signal is detected and the target object exists, the control circuit is configured to control the occlusion component to move to a second position on the electronic device to expose the lens.

The embodiment of the disclosure also provides a control method for the occlusion component. The occlusion component is configured to occlude a lens of an electronic device. The control method for the occlusion component includes: in a first status of the electronic device, controlling the occlusion component to be located at a first position on the electronic device to occlude the lens; and in a second status of the electronic device, detecting a trigger signal and a target object in front of the lens, and the trigger signal is generated by triggering a physical button on the electronic device, and the first status is different from the second status. In a situation where the trigger signal is detected and the target object exists, the occlusion component is controlled to move to a second position on the electronic device to expose the lens.

Based on the above, in the first status of the electronic device, the occlusion component is located at the first position on the electronic device to occlude the lens of the electronic device. Then, in the second status of the electronic device, the trigger signal and the target object in front of the lens may be detected. In particular, the trigger signal is generated by triggering a physical button on the electronic device, and the first status is different from the second status. In a situation where the trigger signal is detected (for example, the user presses the physical button) and the target object exists (for example, the user is operating the electronic device), the occlusion component can automatically move to the second position on the electronic device to expose the lens. In this way, it is possible to achieve fully automatic lens security control through the interaction between the electronic components of the hardware without reducing the convenience of the lens of the electronic device.

DETAILED DESCRIPTION OF DISCLOSED EMBODIMENTS

Figure 1:
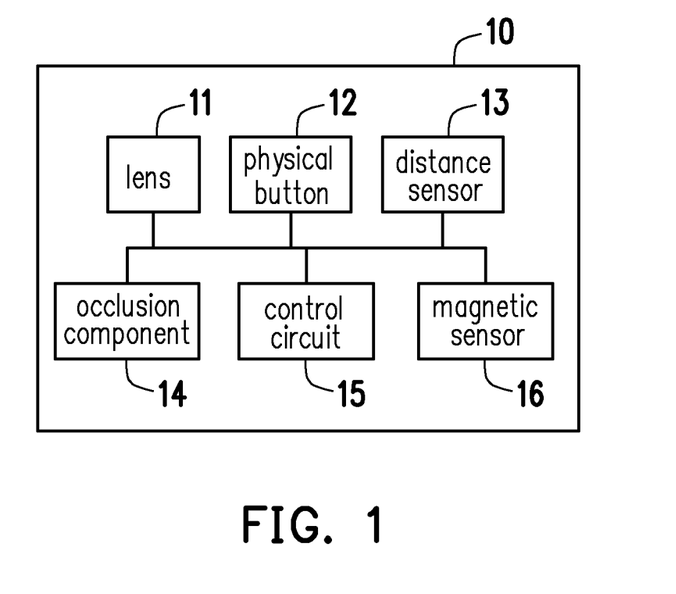
FIG. 1 is a functional block diagram of an electronic device according to an embodiment of the disclosure.

FIG. 1 is a functional block diagram of an electronic device according to an embodiment of the disclosure. Referring to FIG. 1, an electronic device 10 includes a lens 11, a physical button 12, a distance sensor 13, an occlusion component 14 and a control circuit 15. The lens 11 is disposed on the electronic device 10 and configured to capture external images. For example, the lens 11 may include at least one lens element and at least one photosensitive element. The lens 11 may capture external images through the lens element and the photosensitive element. For example, the lens 11 may include a red/green/blue (RGB) lens or other types of optical lenses. In addition, the total number of the lens 11 may be one or more.

The physical button 12 is disposed on the electronic device 10 and may be touched and/or pressed by the user. For example, the physical button 12 may be disposed on the surface of the electronic device 10. When the physical button 12 is touched and/or pressed by the user, the physical button 12 is triggered and a trigger signal is generated. In other words, the trigger signal is generated by triggering the physical button 12. By detecting this trigger signal, whether the physical button 12 is triggered (for example, touched or pressed) may be determined. For example, the physical button 12 may be a mechanical physical button (for example, with a spring structure) and/or an inductive physical button (for example, with a sensor film), etc., which is not limited in the disclosure. The specific structure and disposition method of the physical button 12 may be adjusted according to practical requirements.

The distance sensor 13 is disposed on the electronic device 10 and is configured to detect a specific object (also referred to as a target object) in front of the lens 11. For example, in some situations, if an object in front of the lens 11 meets certain conditions, the object may be regarded as a target object (indicating that the target object exists at this time). For example, the target object may generally refer to a user (such as an operator) of the electronic device 10. In addition, the target object in front of the lens 11 may also refer to the target object in front of the electronic device 10. On the contrary, if the object in front of the lens 11 does not meet the specific conditions, the object may not be regarded as the target object (indicating that the target object does not exist at this time). In an embodiment, the distance sensor 13 may include a proximity sensor. For example, the distance sensor 13 may include an optical sensor such as an infrared sensor or an electrical radiation sensor.

The occlusion component 14 is disposed on the electronic device 10 and may physically occlude or expose the lens 11 by moving to different positions on the electronic device 10. For example, the part of the occlusion component 14 configured to occlude the lens 11 may include an opaque material. When the occlusion component 14 is at a certain position (also referred to as the first position) on the electronic device 10, the lens 11 can be occluded by the occlusion component 14. When the lens 11 is occluded by the occlusion component 14, no matter whether the lens 11 is activated or not, the lens 11 cannot capture external images. On the other hand, when the occlusion component 14 is moved to another position on the electronic device 10 (also referred to as the second position), the lens 11 may not be occluded by the occlusion component 14 and may be exposed on the surface of the electronic device 10. When the lens 11 is not occluded by the occlusion component 14, the lens 11 may be activated to capture external images. In an embodiment, the occlusion component 14 may be moved on the electronic device 10 by a physical movement mechanism such as a moving track on the electronic device 10.

The control circuit 15 is coupled to the lens 11, the physical button 12, the distance sensor 13 and the occlusion component 14. The control circuit 15 may control the occlusion component 14 to move on the electronic device 10 according to information or signals from the physical button 12 and the distance sensor 13. For example, the control circuit 15 may include a central processing unit (CPU), a graphics processing unit (GPU), or other programmable general-purpose or special-purpose microprocessors, digital signal processors (DSP), programmable controllers, application specific integrated circuits (ASIC), programmable logic devices (PLD) or other similar devices or a combination of these devices.

In an embodiment, in a certain status (also referred to as the first status) of the electronic device 10, the control circuit 15 may control the occlusion component 14 to be at the first position on the electronic device 10 to occlude the lens 11. For example, the first status may include one of the shutdown status and the sleep status of the electronic device 10. In the first status (for example, when the electronic device 10 is in the shutdown status or the sleep status), the occlusion component 14 is maintained at the first position to occlude the lens 11. In this way, the lens 11 can be prevented from being activated by a hacker, and the user's private image can be prevented from being captured when the electronic device 10 is turned off and/or in the sleep status (or other situations where the user is unaware of the lens).

In an embodiment, in the second status of the electronic device 10, the control circuit 15 may detect the trigger signal generated by triggering the physical button 12 and detect the target object in front of the lens 11 via the distance sensor 13. It should be noted that the first status is different from the second status. For example, the second status may include the normal working status of the electronic device 10. For example, the electronic device 10 is regarded as being in the second status after the electronic device 10 is turned on until the next shutdown, or after the electronic device 10 leaves the sleep status until entering the next sleep status. Alternatively, the second status may also include at least a part of or all of the working status other than the first status supported by the electronic device 10.

In an embodiment, before the electronic device 10 enters the second status, the physical button 12 and/or the distance sensor 13 may not be enabled (for example, not powered). After the electronic device 10 enters the second status, the physical button 12 and the distance sensor 13 may be enabled (for example, powered) to perform their respective functions. In an embodiment, the power consumption per unit time of the electronic device 10 in the second status is higher than the power consumption per unit time of the electronic device 10 in the first status.

In an embodiment, during the period when the electronic device 10 is in the second status, in a situation where the trigger signal is detected and the target object exists, the control circuit 15 may control the occlusion component 14 to move to the second position on the electronic device 10 to expose the lens 11. For example, after the electronic device 10 is turned on, if the physical button 12 is triggered (indicating that the user has the intention to turn on the lens 11) and the user of the electronic device 10 does exist (indicating that the user is operating the electronic device 10), the control circuit 15 may control the occlusion component 14 to automatically move to the second position to expose the lens 11. When the lens 11 is exposed, the lens 11 may be activated to capture external images (for example, to capture an image of a user in front of the lens 11).

In an embodiment, during the period when the electronic device 10 is in the second status, in response to not detecting the trigger signal and/or the absence of the target object, the control circuit 15 may maintain the occlusion component 14 at the first position on the electronic device 10 (that is, the occlusion component 14 is not moved to the second position) to occlude the lens 11. For example, in an embodiment, after the electronic device 10 is turned on, if the trigger signal corresponding to the physical button 12 is detected but the target object does not exist, it means that the user of the electronic device 10 does not exist at this time (that is, a user is not in front of the electronic device 10 or the lens 11). In this situation, the control circuit 15 may treat the detected trigger signal as being generated by touch from the physical button 12 by mistake (for example, by a pet), and may ignore the trigger signal. Therefore, the control circuit 15 does not move the occlusion component 14 to the second position. Or in an embodiment, after the electronic device 10 is turned on, if the trigger signal corresponding to the physical button 12 is not detected but the target object exists, it means that although the user of the electronic device 10 exists, the user has no intention of turning on the lens 11 (that is, the user does not manually touch or press the physical button 12). In this situation, the control circuit 15 also does not move the occlusion component 14 to the second position. In this way, the aforementioned can effectively reduce the situation where the user's private image is illegitimately recorded when the lens 11 is accidentally activated or activated by the remote control of a hacker when the electronic device 10 is turned on.

In an embodiment, during the period when the occlusion component 14 is at the second position, in response to the electronic device 10 being switched back to the first status (for example, the electronic device 10 is shut down), the control circuit 15 may control the occlusion component 14 to return to the first position to occlude the lens 11 again.

Figure 2:
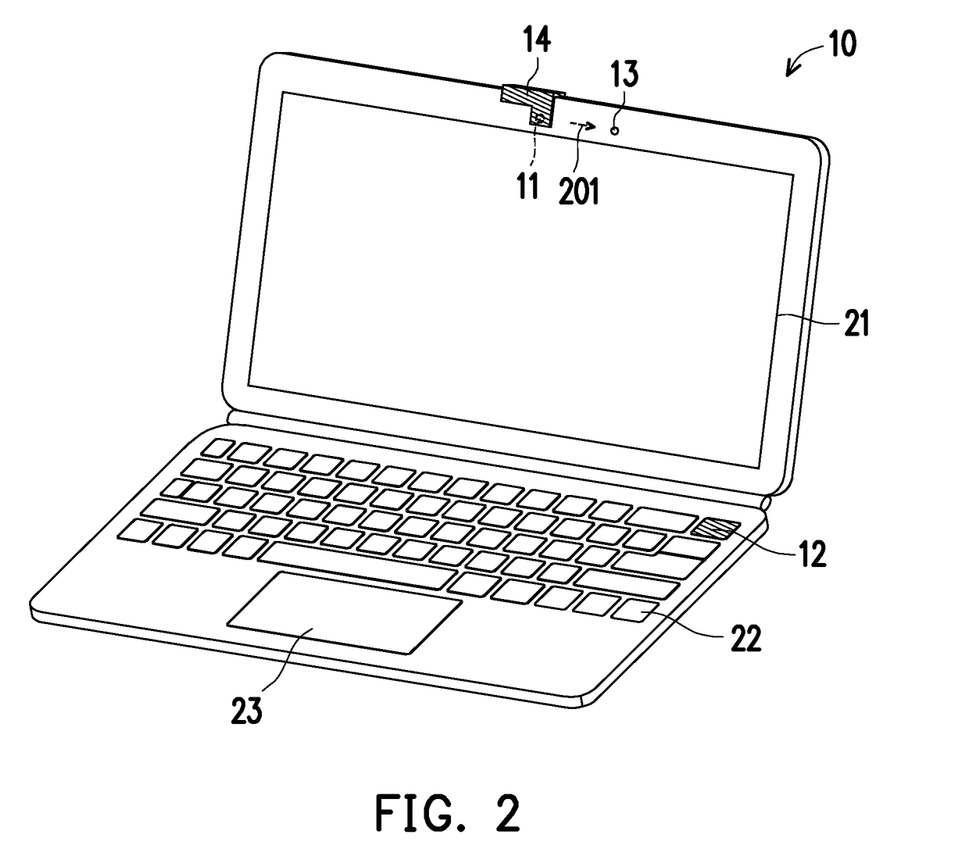
FIG. 2 is a schematic diagram of the occlusion component located at the first position on the electronic device according to an embodiment of the disclosure.
Figure 3:
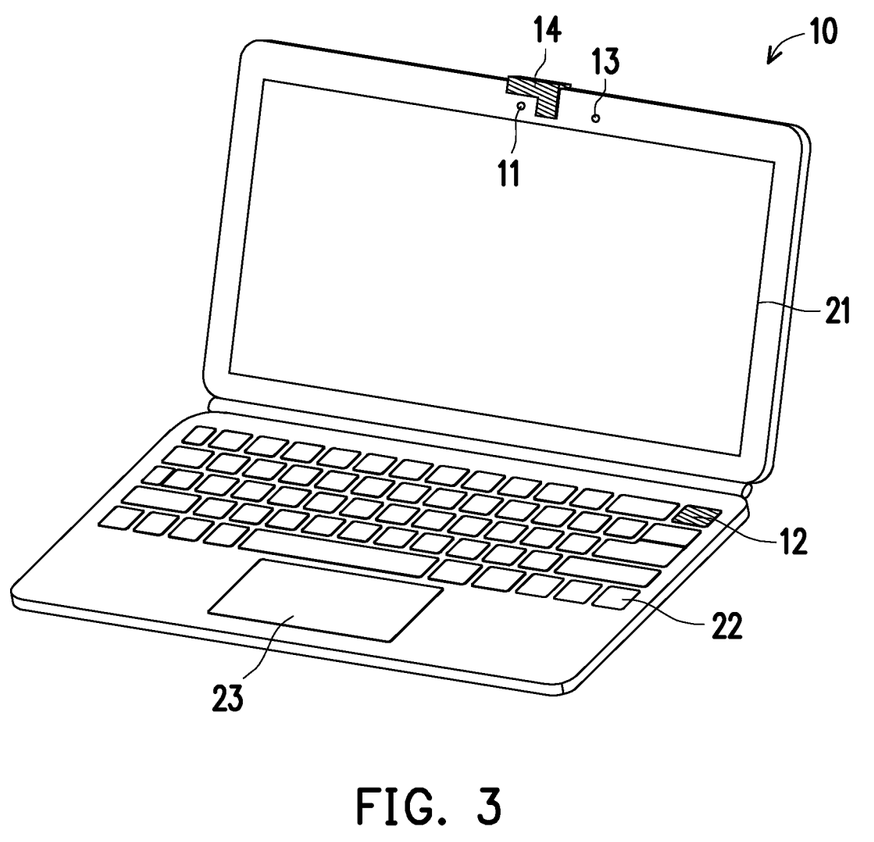
FIG. 3 is a schematic diagram of the occlusion component located at a second position on the electronic device according to an embodiment of the disclosure.

FIG. 2 is a schematic diagram of the occlusion component located at the first position on the electronic device according to an embodiment of the disclosure. FIG. 3 is a schematic diagram of the occlusion component located at a second position on the electronic device according to an embodiment of the disclosure.

Referring to FIGS. 2 and 3, it is assumed that the electronic device 10 is a notebook computer. The lens 11 and the distance sensor 13 may be disposed near a screen 21 (for example, above the screen 21) or at other positions. The physical button 12 may be disposed near a keyboard 22 or at other positions. In addition, the electronic device 10 may include a touch panel 23 or other electronic circuit elements, which is not limited in the disclosure.

In the first status of the electronic device 10, the occlusion component 14 continues to be at the first position on the electronic device 10 to occlude the lens 11, as shown in FIG. 2. However, after switching to the second status, in response to the trigger signal being detected and the existence of the target object, the occlusion component 14 may automatically move along a direction 201 to the second position to expose the lens 11, as shown in FIG. 3.

It should be noted that although FIGS. 2 and 3 show a notebook computer as an example of the electronic device 10, the disclosure is not limited thereto. For example, in an embodiment, the electronic device 10 may also include various electronic devices that support image capturing functions, such as a smart phone, a tablet computer, a gaming console, or a self-service machine (such as a Kiosk), which is not limited in the disclosure.

It should be noted that, in other embodiments of FIGS. 2 and 3, the total number of the lens 11 and/or the occlusion component 14 that is configured to occlude the lens 11 may also be more than one, and one occlusion component 14 may be configured to occlude one or more lenses. In addition, the shape of the occlusion component 14 may also be adjusted according to practical requirements, which is not limited in the disclosure .

Returning back to FIG. 1, in an embodiment, the control circuit 15 may detect an object in front of the lens 11 via the distance sensor 13. The control circuit 15 may determine whether the distance between the object and the distance sensor 13 is less than a threshold value. In response to the distance between the object and the distance sensor 13 being less than the threshold value, the control circuit 15 may determine that the target object exists. In other words, when the distance between the object and the distance sensor 13 is less than the threshold value, the control circuit 15 may determine the object as the target object and determine that the target object exists. For example, at this time, both the object and the target object are the user who is operating the electronic device 10. On the other hand, in response to the distance between the object and the distance sensor 13 not being less than the threshold value, the control circuit 15 may determine that the target object does not exist.

In an embodiment, the electronic device 10 may further include a magnetic sensor 16. For example, the magnetic sensor 16 may include a Hall sensor. In the second status of the electronic device 10, the control circuit 15 may detect the position status of the occlusion component 14 via the magnetic sensor 16. For example, the position status of the occlusion component 14 may reflect that the occlusion component 14 is currently at the first position or the second position. When the position of the occlusion component 14 changes, the sensing result of the occlusion component 14 by the magnetic sensor 16 changes. The control circuit 15 may obtain the position status of the occlusion component 14 according to the sensing result. Then, the control circuit 15 may control the occlusion component 14 to move according to the sensing result. For example, in the second status of the electronic device 10, if the position status of the occlusion component 14 reflects that the occlusion component 14 is currently at the first position, the control circuit 15 may control the occlusion component 14 to move to the second position. Alternatively, when the electronic device 10 switches from the second status to the first status, if the position status of the occlusion component 14 reflects that the occlusion component 14 is currently at the second position, the control circuit 15 may control the occlusion component 14 to return to the first position. In addition, the control circuit 15 may also include other types of sensors to detect the position status of the occlusion component 14, which is not limited in the disclosure.

Figure 4:
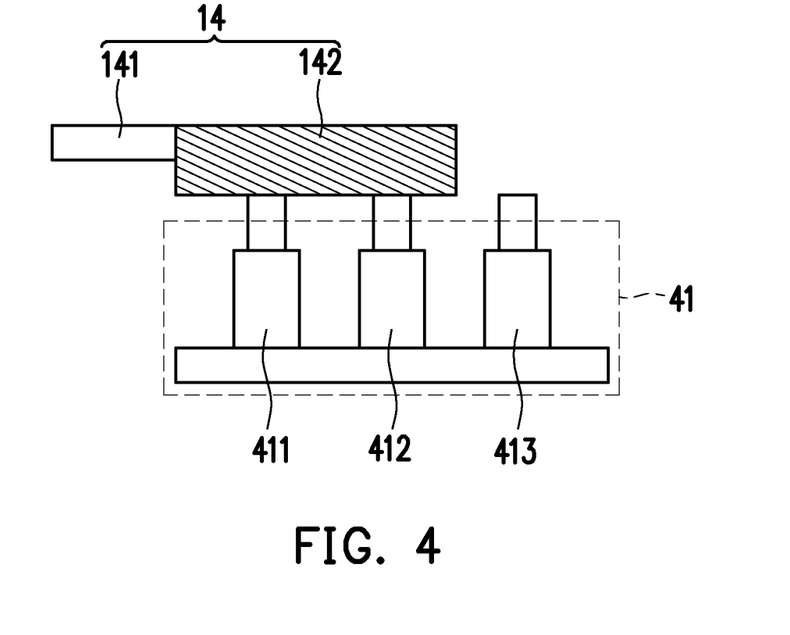
FIGS. 4 and 5 are schematic diagrams of the position status of detecting the occlusion component according to an embodiment of the disclosure.
Figure 5:
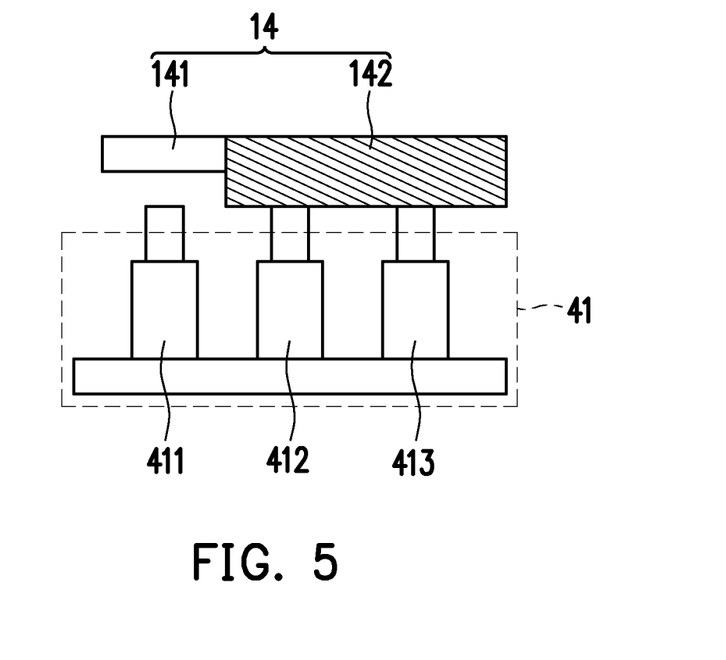

FIGS. 4 and 5 are schematic diagrams of the position status of detecting the occlusion component according to an embodiment of the disclosure. Referring to FIGS. 4 and 5, in an embodiment, the occlusion component 14 includes a non-conductor portion 141 and a conductor portion 142. The non-conductor portion 141 is not conductive, and the conductor portion 142 is conductive. The change in the sensing value caused by the conductor portion 142 on pins 411 to 413 of a sensor 41 may reflect the change in the position of the occlusion component 14.

For example, in the embodiment of FIG. 4, when the occlusion component 14 is at the first position, the conductor portion 142 is in electrical contact with the pins 411 and 412 of the sensor 41 (or close to the pins 411 and 412). At this time, the sensing value (also referred to as the first sensing value) caused by the conductor portion 142 on the pins 411 to 413 of the sensor 41 based on the first position may reflect that the occlusion component 14 is currently at the first position. Alternatively, in the embodiment of FIG. 5, when the occlusion component 14 is in the second position, the conductor portion 142 is in electrical contact with the pins 412 and 413 of the sensor 41 (or close to the pins 412 and 413). At this time, the sensing value (also referred to as the second sensing value) caused by the conductor portion 142 on the pins 411 to 413 of the sensor 41 based on the second position may reflect that the occlusion component 14 is currently at the second position. It should be noted that the magnetic sensor 16 may or may not include the sensor 41 of FIG. 5.

Figure 6:
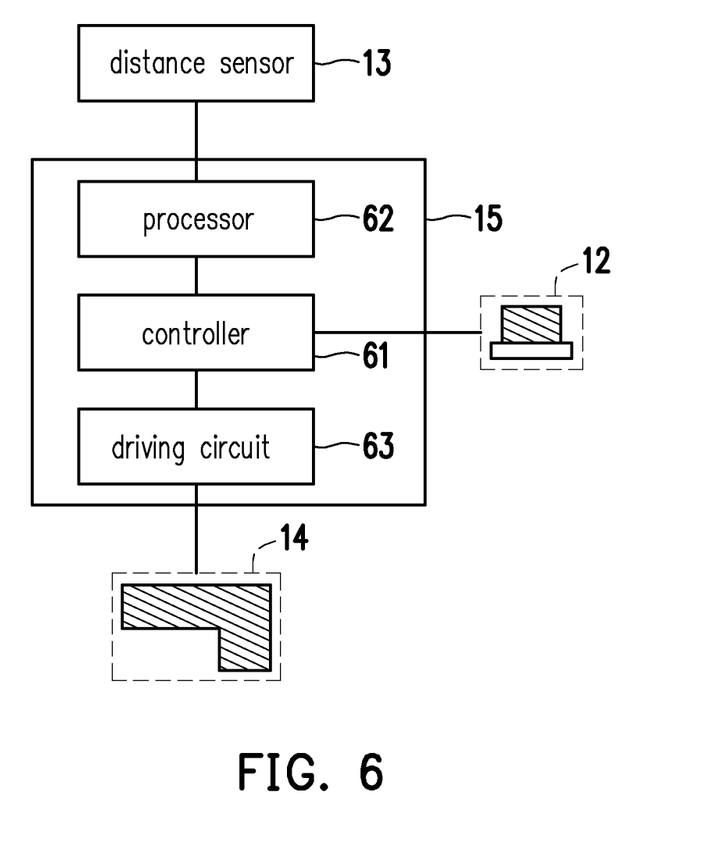
FIG. 6 is a functional block diagram of a control circuit according to an embodiment of the disclosure.

FIG. 6 is a functional block diagram of a control circuit according to an embodiment of the disclosure. Referring to FIG. 6, in an embodiment, the control circuit 15 may include a controller 61, a processor 62 and a driving circuit 63. The processor 62 is coupled to the distance sensor 13. The controller 61 is coupled to the physical button 12, the processor 62 and the driving circuit 63. The driving circuit 63 is coupled to the occlusion component 14. The controller 61 may include various controllers such as an embedded controller or a microcontroller. The processor 62 may include an image signal processor. The driving circuit 63 may include a driving chip and a motor mechanism.

The processor 62 may determine whether the target object exists according to the sensing result of the distance sensor 13. For example, after the distance sensor 13 detects an object in front of the lens 11, the processor 62 may determine whether the distance between the object and the distance sensor 13 is less than a threshold value. If the distance is less than the threshold value, the processor 62 may determine that the target object exists. If the distance is not less than the threshold value, the processor 62 may determine that the target object does not exist.

When the target object exists, the processor 62 may enable the controller 61. The enabled controller 61 may send a control signal to the driving circuit 63 in response to a trigger signal from the physical button 12. The driving circuit 63 may drive the occlusion component 14 to move to the second position in response to the control signal. For example, the driving chip in the driving circuit 63 may receive the control signal and drive the motor mechanism to move the occlusion component 14 to the second position according to the control signal. On the other hand, when the target object does not exist, the processor 62 may not enable the controller 61. When the controller 61 is not enabled, the controller 61 may not send the control signal regardless of whether the trigger signal exists.

It should be noted that in the embodiment of FIG. 6, the movement control of the occlusion component 14 by the driving circuit 63 is completely independently controlled by the hardware circuit (i.e., the controller 61 and the processor 62). From another perspective, during the movement control process of the occlusion component 14 by the driving circuit 63, the operating system of the electronic device 10 may not interfere. In this way, it is possible to effectively reduce the probability that a hacker may remotely control the movement of the occlusion component 14 by intruding into the operating system of the electronic device 10.

It should be noted that the sensor 41 in FIG. 4 (or FIG. 5) and the control circuit 15 in FIG. 6 are only examples, and are not intended to limit the disclosure. In other embodiments, the internal structure of the sensor 41 and the control circuit 15 may be adjusted according to practical requirements, which is not limited by the disclosure.

Figure 7:
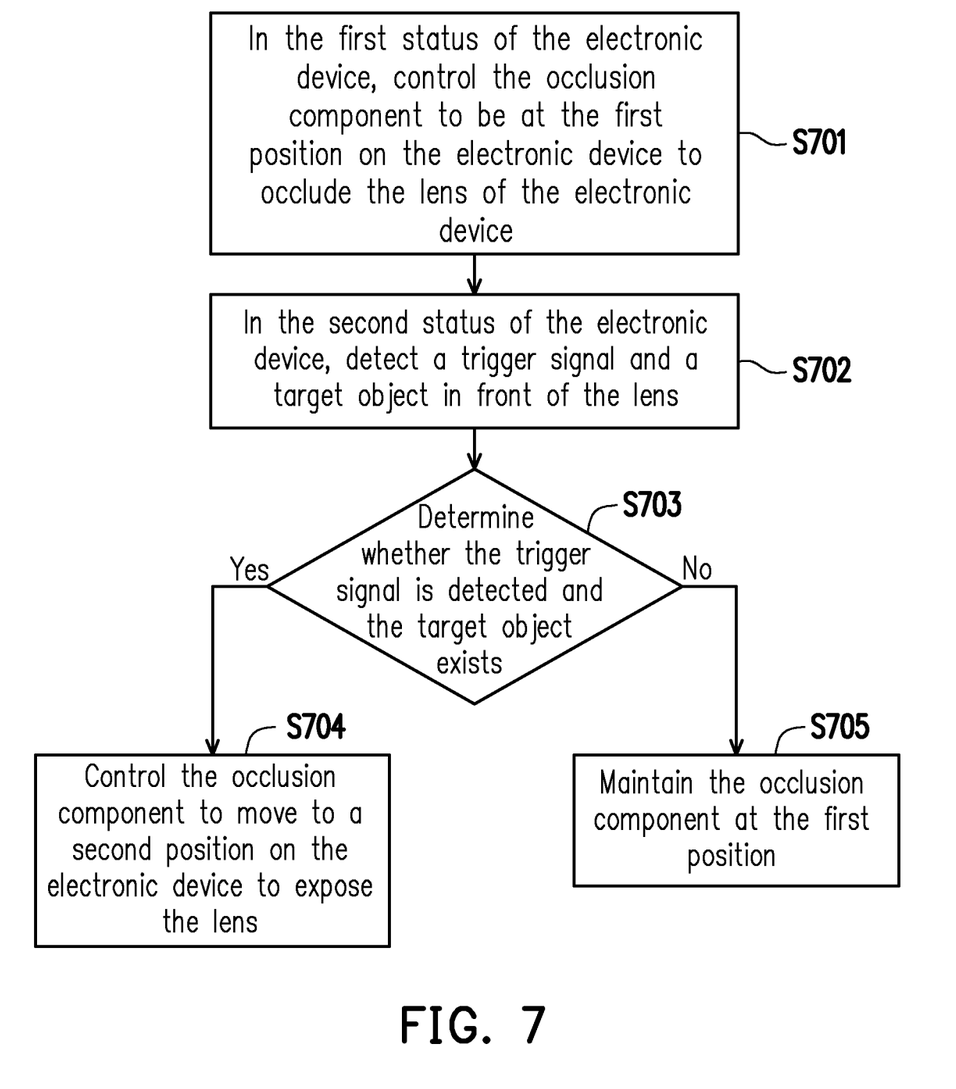
FIG. 7 is a flowchart of a control method for an occlusion component according to an embodiment of the disclosure.

FIG. 7 is a flowchart of a control method for an occlusion component according to an embodiment of the disclosure. Referring to FIG. 7, in step S701, in the first status of the electronic device, the occlusion component is controlled to be at the first position on the electronic device to occlude the lens of the electronic device. In step S702, in the second status of the electronic device, a trigger signal and a target object in front of the lens are detected. The trigger signal is generated by triggering a physical button on the electronic device, and the first status is different from the second status. In step S703, it is determined whether the trigger signal is detected and whether the target object exists. In response to detecting the trigger signal and the existence of the target object, in step S704, the occlusion component is controlled to move to a second position on the electronic device to expose the lens. On the other hand, in response to not detecting the trigger signal and/or the absence of the target object, in step S705, the occlusion component is maintained at the first position.

However, each step in FIG. 7 has been described in detail as above, and the description is not repeated herein. It should be noted that each step in FIG. 7 may be implemented as multiple program codes or circuits, and the disclosure is not limited thereto. In addition, the method in FIG. 7 may be used in conjunction with the above embodiments, or may be used alone, and the disclosure is not limited thereto.

In summary, in the first status of the electronic device, the occlusion component is maintained at the first position on the electronic device to continuously occlude the lens of the electronic device. After the electronic device is switched to the second status, in response to detecting the trigger signal (for example, the user presses the physical button) and the existence of the target object (for example, the user is operating the electronic device), the occlusion component is automatically moved to the second position on the electronic device to expose the lens. In this way, it is possible to achieve fully automatic lens security control through the interaction between the electronic components of the hardware without reducing the convenience of the lens of the electronic device.

Although the disclosure has been described in detail with reference to the above embodiments, they are not intended to limit the disclosure. Those skilled in the art will understand that it is possible to make changes and modifications without departing from the spirit and scope of the disclosure. Therefore, the protection scope of the disclosure shall be defined by the following claims.

What is claimed is:

1. An electronic device, comprising:
   a lens;
   a physical button;
   a distance sensor;
   an occlusion component; and
   a control circuit, coupled to the physical button, the distance sensor and the occlusion component, wherein the control circuit is configured to:
     in a first status of the electronic device, control the occlusion component to be located at a first position on the electronic device to occlude the lens;
     in a second status of the electronic device, detect a trigger signal generated by triggering the physical button and detect a target object in front of the lens through the distance sensor, wherein the first status is different from the second status; and
     in a situation where the trigger signal is detected and the target object exists, control the occlusion component to move to a second position on the electronic device to expose the lens.

2. The electronic device according to claim 1, wherein the control circuit is further configured to:
   in the second status of the electronic device, in response to not detecting the trigger signal or the absence of the target object, maintain the occlusion component at the first position on the electronic device.

3. The electronic device according to claim 1, wherein the control circuit is further configured to:
   detect an object in front of the lens via the distance sensor;
   in response to a distance between the object and the distance sensor being less than a threshold value, determine that the target object exists; and
   in response to the distance between the object and the distance sensor not being less than the threshold value, determine that the target object does not exist.

4. The electronic device according to claim 1, further comprising:
   a magnetic sensor, coupled to the control circuit,
   wherein the control circuit is further configured to:
     in the second status of the electronic device, detect a position status of the occlusion component via the magnetic sensor.

5. The electronic device according to claim 1, wherein the control circuit further comprises:
   a controller, coupled to the physical button;
   a processor, coupled to the distance sensor and the controller; and a driving circuit, coupled to the controller and the occlusion component,
wherein in the situation where the target object exists, the processor enables the controller,
the controller that is enabled sends a control signal to the driving circuit in response to the trigger signal, and
the driving circuit drives the occlusion component to move to the second position in response to the control signal.

6. The electronic device according to claim 1, wherein a power consumption per unit time of the electronic device in the second status is higher than a power consumption per unit time of the electronic device in the first status.

7. The electronic device according to claim 6, wherein the first status includes one of a shutdown status and a sleep status, and the second status includes a normal working status.

8. The electronic device according to claim 1, wherein in a status that the lens is occluded by the occlusion component, the lens cannot capture an external image.

9. The electronic device according to claim 1, wherein the occlusion component is moved by a physical movement mechanism on the electronic device.

10. The electronic device according to claim 1, wherein at least one of the physical button and the distance sensor is not enabled until the electronic device enters the second status.

11. A control method for an occlusion component, wherein the occlusion component is configured to occlude a lens of an electronic device, and the control method for the occlusion component comprises:
in a first status of the electronic device, controlling the occlusion component to be located at a first position on the electronic device to occlude the lens;
in a second status of the electronic device, detecting a trigger signal and a target object in front of the lens, wherein the trigger signal is generated by triggering a physical button on the electronic device, and the first status is different from the second status; and
in a situation where the trigger signal is detected and the target object exists, controlling the occlusion component to move to a second position on the electronic device to expose the lens.

12. The control method for the occlusion component according to claim 11, further comprising:
in the second status of the electronic device, maintaining the occlusion component at the first position on the electronic device in response to not detecting the trigger signal or the absence of the target object.

13. The control method for the occlusion component according to claim 11, wherein detecting the target object in front of the lens comprises:
detecting an object in front of the lens via a distance sensor, wherein the distance sensor is disposed on the electronic device;
determining that the target object exists in response to a distance between the object and the distance sensor being less than a threshold value; and
determining that the target object does not exist in response to the distance between the object and the distance sensor not being less than the threshold value.

14. The control method for the occlusion component according to claim 11, further comprising:
in the second status of the electronic device, detecting a position status of the occlusion component via a magnetic sensor, wherein the magnetic sensor is disposed on the electronic device.

15. The control method for the occlusion component according to claim 11, wherein controlling the occlusion component to move to the second position on the electronic device comprises:
enabling a controller via a processor in the situation where the target object exists;
sending a control signal to a driving circuit by the controller that is enabled in response to the trigger signal, and
driving the occlusion component to move to the second position by the driving circuit in response to the control signal, wherein the processor, the controller, and the driving circuit are all disposed in the electronic device.

16. The control method for the occlusion component according to claim 11, wherein a power consumption per unit time of the electronic device in the second status is higher than a power consumption per unit time of the electronic device in the first status.

17. The control method for the occlusion component according to claim 16, wherein the first status includes one of a shutdown status and a sleep status, and the second status includes a normal working status.

18. The control method for the occlusion component according to claim 11, wherein in a status that the lens is occluded by the occlusion component, the lens cannot capture an external image.

19. The control method for the occlusion component according to claim 11, wherein the occlusion component is moved by a physical movement mechanism on the electronic device.

20. The control method for the occlusion component according to claim 11, wherein at least one of the physical button and the distance sensor is not enabled until the electronic device enters the second status.

* * * * *